United States Patent Office 3,544,677
Patented Dec. 1, 1970

3,544,677
RODENT BAITING WITH ANTICOAGULANT
HALOPYRIDINE DERIVATIVES
Karyn L. Lapham, Midland, Mich., and Philip J. Shea,
Indianapolis, Ind., assignors to The Dow Chemical
Company, Midland, Mich., a corporation of Delaware
No Drawing. Filed Apr. 1, 1968, Ser. No. 717,948
Int. Cl. A01n 9/22, 17/44
U.S. Cl. 424—17                                    7 Claims

ABSTRACT OF THE DISCLOSURE

A method and composition therein employed which comprises administering to warm-blooded animals a halopyridine derivative comprising 2,3,5-trichloro-4-pyridine acetate, alkali metal tetrahalopyridylate, ammonium tetrahalopyridylate or a tetrahalopyridyl ester, wherein the ester moiety represents alkyl or halogenated alkylcarbonyl, alkyliminocarbonyl, phenylthiocarbonyl, phenylcarbonyl and phenylsulfonyl. The method and composition are useful for inhibiting the coagulation of blood, and are particularly useful for the control of rodents.

BACKGROUND OF THE INVENTION

The halopyridine derivatives employed as the active ingredients in the composition and method of the invention are known to be useful as herbicides as disclosed by Martin, U.S. Pat. 3,249,419. The compounds can be conveniently prepared in the conventional and known procedures described by Martin.

Thus, the halopyridinols can be prepared by heating the appropriate halopyridines with about 10 percent aqueous sodium hydroxide at temperatures of from about 160° to about 190° C. for about 2 to 3 hours. The alkali metal and ammonium salts of the halopyridinols can be prepared by mixing equimolar or equivalent proportions of the halopyridinol and a base, either ammonia or an alkali metal hydroxide, preferably in an inert organic solvent medium, and thereafter evaporating the mixture to remove the solvent. The esters can be prepared by heating together the sodium salt of the desired halopyridinol and the acid chloride of the appropriate acid (such as acetyl chloride, benzenesulfonyl chloride or pentanoyl chloride) in the presence of an appropriate inert organic solvent and thereafter filtering or washing out the sodium chloride by-product and recovering the ester by conventional procedures such as evaporation or distillation. Other conventional procedures for preparing salts and esters can also be employed to prepare the salt and ester active ingredients of the invention.

SUMMARY OF THE INVENTION

The present invention is directed to a novel method and composition useful for the inhibition of blood coagulation in animals. In particular, the invention is directed to a method useful for lowering the blood prothrombin activity in warm-blooded animals by orally administering to a warm-blooded animal an anticoagulant dose of a halopyridine derivative. The invention is also directed to a method useful for lowering the blood prothrombin activity level in rodents in order to control rodents comprising orally administering to a rodent an anticoagulant dose of a halopyridine derivative. The invention also includes compositions useful in the method of the invention.

The method of the present invention comprises administering orally to warm-blooded animals an anticoagulant dose of a halopyridine derivative selected from 2,3,5-trichloro-4-pyridyl acetate and tetrahalopyridine derivatives corresponding to the formula

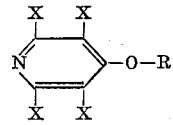

wherein X represents chlorine or bromine and R represents hydrogen, sodium, potassium, ammonium, alkylcarbonyl, haloalkylcarbonyl, dihaloalkylcarbonyl, alkyliminocarbonyl, phenylthiocarbonyl, phenylcarbonyl or phenylsulfonyl. Preferred compounds for use in the composition and method of the invention include 2,3,5-trichloro-4-pyridyl acetate and the derivatives of 2,3,5,6-tetrachloro-4-pyridinol or 2,3,5,6-tetrabromo-4-pyridinol corresponding to the above formula wherein R represents hydrogen, sodium, potassium, methylcarbonyl, dichloromethylcarbonyl, bromomethylcarbonyl, 1,1-dichloroethylcarbonyl, heptadecylcarbonyl, alkyliminocarbonyl, phenylthiocarbonyl, phenylcarbonyl or phenylsulfonyl. In the present specification and claims, the term "alkyl" in alkylcarbonyl, mono- and dihaloalkylcarbonyl, alkyliminocarbonyl and alkylthiocarbonyl represents an alkyl moiety containing 1 to 17 carbon atoms. Representative alkyl moieties include methyl, ethyl, propyl, butyl, pentyl, hexyl, heptyl, octyl, nonyl, decyl, undecyl, dodecyl, tridecyl, tetradecyl, pentadecyl, hexadecyl and heptadecyl. As employed herein, the term "halo" refers to chlorine and bromine. For the sake of convenience, the compounds employed in the present invention will be hereinafter referred to generically as halopyridine derivatives.

The halopyridine derivatives employed in the method and composition of the present invention are solid or semi-solid materials which are slightly soluble in water and of moderate solubility in common organic solvents such as acetone and benzene. The compounds are potent inhibitors of blood coagulation and are characterized by a rapid onset of anticoagulant action. The halopyridine derivatives are not repellent to animals and can be employed in admixture with animal feeds or rations and nutritive compositions. The lack of animal repellency in the active ingredient thus makes possible the formulation of compositions which are particularly useful as baits to be ingested by rodents when the compounds are employed for the control of such animal pests as rats and mice.

The halopyridine derivatives have a rapid onset of anticoagulant action, that is, rapid inhibition of blood clotting. Oral administration of the halopyridine derivatives results in a lowering of prothrombin activity in the cardiovascular system, with a consequent increase in the time required for clot formation and an inhibition of blood coagulation. For example, the representative compound 2,3,5,6-tetrachloro-4-pyridinol produces inhibition of blood coagulation within a few hours after administration and the anticoagulant effects of the compounds have been observed to continue for up to as long as one week after a single administration of the compound, depending upon the particular dosage employed and the particular animal treated. The method and composition of the invention can be employed to inhibit the formation of thrombi in animals and to inhibit coagulation of blood withdrawn from animals, as when animals are bled to obtain whole blood, plasma or components thereof such as albumin, globulin or the like. The invention can also be employed to inhibit blood coagulation and lower prothrombin activity to a greater degree, to a point at which internal hemorrhaging and loss of fluid from the vascular system results. Hemorrhaging sufficient to result in death of the animal can be produced by administration of the halopyridine derivatives in large single doses or repeated smaller doses.

The anticoagulant action obtained by the practice of the invention can thus be employed for disposal of undesired animals such as rodents.

The oral administration or feeding of an anticoagulant dosage of one or more halopyridine derivative is critical and essential for the practice of the invention. An anticoagulant dose is that amount of compound administered to give a substantial lowering of prothrombin level and includes dosages both above and below the dosage at which the prothrombin level is lowered to the point at which internal hemorrhaging occurs. The exact dose can vary depending upon such factors as the particular compound employed, the physical condition of the animal administered the compound, the species of animal, the conditions under which the compound is given, whether the result desired is inhibition of blood coagulation with or without internal hemorrhaging and the like. When it is desired to employ the method and composition of the invention to control rodents, a halopyridinol derivative is administered to a rodent at an anticoagulant dose which is sufficient to lower the prothrombin activity of the rodent to the point at which internal hemorrhaging occurs. The anticoagulant dose employed to control rodents need not be as high as an acute toxic or rodenticidal dose, since useful control of rodents can be obtained by frequent repeated administration of an anticoagulant dose, but less than an acute lethal dose of the halopyridine derivative until the resultant hemorrhaging brings about death of the treated rodent.

When it is desired to inhibit blood coagulation without bringing about hemorrhaging, a lower anticoagulant dose can be employed. In general, an anticoagulant dose will be from about 10 to about 200 milligrams of halopyridine derivative per kilogram of animal body weight per day. When anticoagulant activity without internal hemorrhaging is desired, an anticoagulant dose of from about 10 to about 50 milligrams of halopyridine derivative can be employed. When it is desired to obtain anticoagulant activity to the point at which internal hemorrhaging takes place, it is preferred to administer the halopyridine derivative at an anticoagulant dose of from about 50 to about 125, to about 200 milligrams of halopyridine derivative per kilogram of animal body weight per day. Higher dosages can also be employed, if desired.

The method of the present invention can be carried out by the oral administration or feeding of the unmodified compounds. However, the invention also includes administration of the halopyridine derivatives in the form of orally ingestible compositions. In such usage, the compounds can be modified with one or more of a plurality of additaments or innocuous ingestible adjuvants including water, ethanol, skim milk, edible oils, propylene glycol, syrups, grain rations including whole grains and seeds, grain meals and flours, binders such as magnesium stearate and ethyl cellulose, surface active dispersing agents such as the liquid and solid emulsifying agents and edible solid carriers such as edible powders and commercial animal feeds, concentrates or supplements. By "commercial animal feeds, concentrates or supplements" are meant the partial and complete animal feeds containing desirable amounts of minerals, vitamine, antioxidants, amino acids and the like. When the compositions are employed as baits for the control of rodents, it is desirable to incorporate such minerals, vitamins and the like as may be lacking in the food materials otherwise available to the rodents.

In such orally ingestible compositions, the adjuvant cooperates with the active agent so as to facilitate the invention and obtain an improved result. Further, the compositions are adapted to be fed to animals to supply the desired dosage of active agent, or to be employed as concentrates and subsequently diluted with additional carrier or adjuvant to produce the ultimate compositions.

Preferred compositions are those which comprise an ingestible adjuvant in admixture with a sugar and, optionally, an attractant flavoring substance. Suitable sugars for use in such compositions include sucrose, dextrose, fructose, lactose, cane or beet sugar, corn sugars and milk sugars or mixtures thereof. The sugar and flavoring substance cooperate with the other ingredients to obtain improved results, to improve the palatability of the compositions and to improve the effects of the compositions and to improve the effects of the compositions when employed as baits. The sugar can be added to the ingestible adjuvant in any convenient manner. When the ingestible carrier is a whole grain, seed or other unprocessed plant product, the composition is preferably prepared by dispersing an anticoagulant amount of the halopyridine derivative in a sugar syrup such as corn syrup, cane or beet sugar syrup or invert sugar syrup. The whole grain or seed carrier is then coated with the syrup dispersion. The sugar thus can serve to disperse the halopyridine derivative and to bind it to the grain or seed adjuvant. Such preferred compositions desirably contain at least about 5 percent added sugar by weight of ultimate composition, or at least about 10 percent by weight of total sugar.

The term "flavoring substances" is employed to refer to substances which impart to the compositions a flavor which is apparently desirable or attractive to the animal to which the composition is to be administered. The flavoring substances can include substances such as meat products, salt, coconut oil, beef extract, malt and the like. They can also include natural and artificial flavors such as anise oil, vanilla extract, vanillin, banana oil (amyl acetate), saccharin, sodium cyclamate, calcium cyclamate or the like. When the compositions are to be employed for the control of rodents, it is preferred that the flavoring substances be a volatile odoriferous substance which is attractive to the rodents to be controlled. The particular volatile odoriferous flavoring substance to be employed to greatest advantage in a particular application can be ascertained by conventional procedures such as sampling or prebaiting with different volatile flavors to determine acceptance.

The proportions of the active halopyridine derivatives to be employed in the compositions of the invention can be varied over a substantial range, subject to the practical limitations of the compositions employed and to the limitation that an anticoagulant amount be employed in the ultimate composition. In general, the compositions containing an anticoagulant amount of the active ingredient will contain at least about 0.02 percent by weight of one of the active halopyridine derivatives. Best results are obtained with compositions containing at least 0.05 percent or more of the halopyridine derivative. Concentrated compositions adapted for dilution by the addition of additional ingestible adjuvants, flavoring substances or sugars can contain as high as 50 percent or more, or as high as 90 percent of the active halopyridine derivative. Such compositions are adapted for dilution to prepare the ultimate treating compositions.

The compositions of the invention can be formulated in a variety of physical forms, including syrup or liquid formulations, solid preparations including powders, tablets, granules or pellet forms, coatings on seeds or whole grain such as corn, wheat, rice or the like and other conventional physical forms. It is particularly desirable that compositions employed to control rodents be prepared in units having a particular maximum active ingredient concentration. The maximum dosage is selected so that any particular unit will not contain sufficient halopyridine derivative to cause hemorrhaging if ingested by larger animals such as cats, dogs or humans, while each such unit contains a rodent-controlling amount of the active ingredient. The formulation of such dosage units permits the placement of separate units of the composition in different locations to further protect against accidental ingestion of overdoses by larger animals. In practice, it is desirable for each unit to be no larger than about 20 grams and for each unit to contain no more than about 20 milligrams of the active halopyridine derivative. Such compositions contain an anticoagulant dose for rodents in each discrete unit; however, ingestion of a single discrete unit by a domestic animal such as a dog or cat, for example, causes insufficient lowering of prothrombin level to result in internal hemorrhaging.

DESCRIPTION OF THE PREFERRED EMBODIMENTS

The following examples are merely illustrative of the invention and are not intended to be limiting.

EXAMPLE 1

A group of the halopyridine derivatives of the present method are tested for anticoagulant activity. In such operations, representative halopyridine derivatives are separately administered to separate groups of rats of the same history and past environment. In carrying out these operations, the compound to be tested is administered intragastrically at a dosage of 150 milligrams per kilogram once daily for two days to each of three rats making up a test group. On the third day, the rats in each group are lightly anesthetized with ether and blood samples are obtained from each rat by cardiac puncture. The blood samples are mixed well with a solution of potassium oxalate in aqueous sodium chloride and centrifuged at 2200 gravities for twelve minutes to produce platelet poor plasma. The platelet poor plasma is then diluted with aqueous sodium chloride solution to prepare a solution containing 25 percent plasma. To 0.1 milliliter of this 25 percent plasma solution is added 0.2 milliliter of thromboplastin suspension and the time required for the formation of a clot is measured. Blood from a control group consisting of three untreated rats is obtained, prepared and the prothrombin time is determined as described above. The mean prothrombin time for each test group is calculated and compared to the results obtained with the control group. The prothrombin time observed with each group of rats administered a test compound is expressed in terms of the prothrombin time for the control group and set out in the following table.

PROTHROMBIN TIME ACTIVITY

| Compound administered: | Prothrombin time |
|---|---|
| None (control group) | 1.0 |
| 2,3,5,6-tetrachloro-4-pyridyl stearate | 2.3 |
| S-phenyl 0-2,3,5,6-tetrachloro-4-pyridyl thiocarbonate | 2.8 |
| 2,3,5,6-tetrachloro-4-pyridyl ethylcarbamate | 4.9 |
| 2,3,5-trichloro-4-pyridyl acetate | 4.3 |
| 2,3,5,6-tetrachloro-4-pyridyl methylcarbamate | 6.6 |
| 2,3,5,6-tetrachloro-4-pyridyl benzenesulfonate | 1.4 |
| 2,3,5,6-tetrachloro-4-pyridyl 2,2-dichloropropionate | 4.4 |
| 2,3,5,6-tetrachloro-4-pyridyl benzoate | 1.4 |

EXAMPLE 2

21 male rats each weighing approximately 200 grams are divided into three groups (1, 2 and 3) of seven rats each. 2,3,5,6-tetrachloro-4-pyridyl methylcarbamate is suspended in 0.5 percent aqueous methyl cellulose solution and administered to the rats in Groups 1 and 2 intragastrically once each day for three consecutive days. Group 1 receives 10 milligrams per kilogram per day while Group 2 receives 20 milligrams per kilogram per day and Group 3 (the control group) receives 0.5 percent methyl cellulose solution containing no test compound. On the fourth day, the rats are anesthetized and blood is obtained from each rat via cardiac puncture. The blood thus obtained is admixed with aqueous 10 percent potassium oxalate solution and the resulting suspension is centrifuged at 2500 gravities for twelve minutes to obtain platelet poor plasma as a supernatent fluid. This platelet poor plasma is then diluted with a 0.85 percent sodium chloride solution to prepare a solution containing 25 percent plasma. 0.2 milliliter of the 25 percent plasma solution and 0.1 milliliter of thromboplastin solution are added to the reaction cup of a Mechrolab (Model 202) clot timer. 0.1 milliliter of aqueous 0.025 molar calcium chloride solution is added to the mixture and the prothrombin time is measured. The average prothrombin time observed with the control group of rats is 31.8 seconds as compared with the average prothrombin time of 152.4 seconds observed with the rats of Group 1 administered 10 milligrams per kilogram per day of the test compound. The plasma collected from the rats in Group 2 administered 20 milligrams per kilogram per day of 2,3,5,6-tetracholor-4-pyridinol methylcarbamate is found to form no clots after 500 seconds, at which time the test is discontinued.

EXAMPLE 3

Nine milliliters of blood are drawn from the cephalic vein of two purebred beagle male dogs, eight to nine months old, and weighing approximately 15 kilograms. The blood drawn from each dog is added to 1.0 milliliter of 3.2 percent sodium citrate solution, centrifuged and the platelet poor plasma supernatant is drawn off immediately and stored at 4° C. to serve as control blood samples. Seven hours after the control blood samples are drawn from the dogs, each dog is administered 2,3,5,6-tetrachloro-4-pyridinol sodium salt in a hard gelatin capsule at a dosage rate of 40 milligrams per kilogram. Thereafter, blood samples are withdrawn at 17, 41 and 89 hours following the administration of the test compound. Using standard assay procedures, the prothrombin time is determined and compared to that observed with the control blood samples. The results indicate inhibition of clotting and increases of prothrombin time of about 2-fold at 17 hours, about 3.5-fold at 41 hours and about 2-fold at 89 hours after administration of the test compound.

EXAMPLE 4

In a representative operation, 2,3,5,6-tetrabromo-4-pyridinol is dispersed in a conventional rodent mash. The test compound is thoroughly mixed with the mash to provide an orally-ingestible composition containing 0.02 percent by weight of the test compound. The composition so prepared is fed to a group of six mice as the sole diet. The animals are held and observed and the ET50 of the test compound is calculated by the method of Litchfield, J. Pharmacol. Exptl. Therap., 147, 339–408, 1949. The ET50 is the time at which 50 percent of the animals feeding on the diet will die to within 95 percent confidence limits. In such operations, a composition comprising 0.02 percent by weight of 2,3,5,6-tetrabromo-4-pyridinol in admixture with the edible carrier is found to have an ET50 of eight days.

EXAMPLE 5

In a representative operation, 2,3,5,6-tetrachloro-4-pyridyl acetate is intimately admixed with rodent mash to prepare an orally-ingestible composition containing 0.02 percent by weight of halopyridine derivative. The composition is fed to a group of six mice and the mice are held and observed. In such operations, the composition comprising 0.02 percent by weight of 2,3,5,6-tetrachloro-4-pyridyl acetate is found to have an ET50 of 10.2 days. Observations of the total intake by the animals in each test group during a portion of the test period show that the surviving animals consumed about 60 percent of their own weight in test composition, thus indicating a high acceptance of the test composition.

EXAMPLE 6

Three-tenths part by weight of 2,3,5,6-tetrachloro-4-pyridinol potassium salt and two-tenths part by weight of 2,3,5,6-tetrabromo-4-pyridinol ammonium salt are mixed well with 12 parts by weight of sucrose, 7 parts by weight of wheat starch and 10 parts by weight of non-fat dry milk powder. The resulting mixture is then mixed well with a paste composed of 6 parts of gelatin, 40 parts of wheat starch, 8 parts of dextrose and 75 parts of water. The mixture is granulated, the granulate is passed through an 8 mesh screen and the screened granulate is then dried completely. The granulate is then passed through a 12 mesh screen and mixed with 3.5 parts of magnesium stearate and 13.5 parts powdered talc. The resulting composition is mixed well and compressed into pellets weighing approximately 2 grams each. The resulting composition is adapted to provide an anticoagulant dose of about 100 milligrams of halopyridine derivative per unit. Such unit compositions are adapted to be administered orally to animals to inhibit the coagulation of blood.

EXAMPLE 7

Five parts of weight of 2,3,5-trichloro-4-pyridyl acetate, 5 parts by weight of 2,3,5,6-tetrachloro-4-pyridyl 6,6-dichlorohexanoate, 3 parts by weight of 2,3,5,6-tetrabromo-4-pyridyl butylcarbamate and 2 parts by weight of 2,3,5,6-tetrachloro-4-pyridyl undecylenate are intimately mixed together. The mixture is intimately dispersed in a mixture of 35 parts of sucrose, 4 parts of milk sugar and 25 parts of corn starch. The resulting mixture is thoroughly mixed with a paste containing 2 parts of hydroxypropyl methyl cellulose, 100 parts of corn starch, 0.03 part of amyl acetate and 250 parts of water. The mixture is granulated and dried. The granulate is passed through a 12 mesh screen and mixed with 10 parts of magnesium stearate and 8 parts of talc. The mixture is compressed into pellets weighing about 0.2 gram each. The pellets are adapted to be administered to animals to inhibit blood coagulation.

EXAMPLE 8

Two parts by weight of 2,3,5,6-tetrabromo-4-pyridyl 2-bromobutanoate, 2 parts by weight of 2,3,5,6-tetrachloro-4-pyridyl 3,3-dibromopropionate and 2 parts by weight of 2,3,5,6-tetrabromo-4-pyridyl dodecylcarbamate are intimately mixed with 30 parts of rice flour and 164 parts of dextrose to prepare a powder. The powder is then employed to dust and coat meat scraps of beef and pork trimmings in portions weighing approximately 4 grams each. The unit compositions are employed as baits to administer an anticoagulant amount of the active compound to animals in the control of rodents. The powder is applied in proportions of approximately 1.5 parts of powder per 10 parts of meat product.

What is claimed is:

1. A method for controlling rodents and further protecting against larger dosages to larger animals comprising placing discrete rodent bait units in rodent infested areas, each unit containing no more than an anticoagulant amount for rodents of a halopyridine derivative selected from the group consisting of 2,3,5-trichloro-4-pyridinol acetate and compounds corresponding to the formula

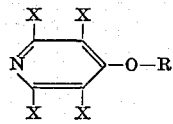

wherein X represents halo and R represents a member of the group consisting of hydrogen, sodium, potassium, ammonium, alkylcarbonyl, haloalkylcarbonyl, dihaloalkylcarbonyl, alkyliminocarbonyl, phenylthiocarbonyl, phenylcarbonyl and phenylsulfonyl, each such unit containing a rodent-controlling amount of such halopyridine derivative, the maximum dosage being selected so that each unit will not contain sufficient halopyridine derivative to cause hemorrhaging if ingested by larger animals such as dogs, cats or humans.

2. The method of claim 1 wherein the halopyridine derivative is 2,3,5,6-tetrachloro-4-pyridinol.

3. The method of claim 1 wherein the halopyridine derivative is 2,3,5,6-tetrachloro-4-pyridinol sodium salt.

4. The method of claim 1 wherein the halopyridine derivative is 2,3,5,6-tetrabromo-4-pyridinol.

5. A discrete rodent-controlling bait unit composition adapted to be ingested orally, the composition comprising at least about 10 percent by weight of a sugar and a rodent controlling amount not more than an anticoagulant amount for rodents of a halopyridine derivative selected from the group consisting of 2,3,5-trichloro-4-pyridinol acetate and compounds corresponding to the formula

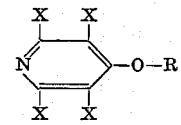

wherein X represents halo and R represents a member of the group consisting of hydrogen, sodium, potassium, ammonium, alkylcarbonyl, haloalkylcarbonyl, dihaloalkylcarbonyl, alkyliminocarbonyl, phenylthiocarbonyl, phenylcarbonyl and phenylsulfonyl in intimate admixture with an edible carrier preferred by the rodents to be controlled.

6. The composition of claim 5 wherein the compound is 2,3,5,6-tetrachloro-4-pyridinol sodium salt.

7. The composition of claim 5 wherein the edible carrier comprises a flavoring substance attractive to the rodents to be controlled.

References Cited

UNITED STATES PATENTS

| | | | |
|---|---|---|---|
| 2,957,804 | 10/1960 | Shuyler | 424—10X |
| 3,206,358 | 9/1965 | Stevenson | 424—263 |
| 3,249,419 | 5/1966 | Martin | 71—94 |
| 3,249,619 | 5/1966 | Johnston | 260—297X |
| 3,335,146 | 8/1967 | Reifschneider et al. | 260—297X |

OTHER REFERENCES

Eckart: Hawaiian Planters' Record 40(2): 157–170 (1936), "Rat Control Investigations at the Lihug Plantation Company, Ltd."

Nickell et al.: Hawaiian Sugar Technologists, 24th Ann. Conf., Nov. 15–18, 1965, pp. 152–163, "Effects of Chemicals on Ripening of Sugarcane."

SHEP K. ROSE, Primary Examiner

U.S. Cl. X.R.

424—2, 84, 263